US005694175A

United States Patent [19]

Gaigneux et al.

[11] Patent Number: 5,694,175

[45] Date of Patent: Dec. 2, 1997

[54] METHOD FOR RECOGNITION OF VIDEO STANDARDS AND CIRCUIT IMPLEMENTING THIS METHOD

[75] Inventors: Frédéric Gaigneux, Chambery; Yong-Uk Lee, Aix En Provence, both of France

[73] Assignee: SGS-Thomson Microelectronics, S.A., Gentilly, France

[21] Appl. No.: 395,497

[22] Filed: Feb. 24, 1995

[30] Foreign Application Priority Data

Feb. 28, 1994 [FR] France .................................. 94 02557

[51] Int. Cl.[6] .................................................. H04N 5/46

[52] U.S. Cl. ........................ 348/558; 345/213; 348/525

[58] Field of Search .................................. 348/558, 553, 348/525, 526, 529, 531; 345/213

[56] References Cited

U.S. PATENT DOCUMENTS

| | | | |
|---|---|---|---|
| 4,683,495 | 7/1987 | Brock | 348/526 |
| 4,962,428 | 10/1990 | Tong et al. | 348/558 |
| 4,991,023 | 2/1991 | Nicols | 345/213 |
| 5,031,118 | 7/1991 | Morizot | 345/213 |
| 5,241,281 | 8/1993 | Wilkes | 348/558 |
| 5,394,171 | 2/1995 | Rabii | 348/558 |
| 5,473,387 | 12/1995 | Okada et al. | 348/526 |
| 5,502,501 | 3/1996 | Rumreich et al. | 348/526 |

*Primary Examiner*—Victor R. Kostak
*Attorney, Agent, or Firm*—Robert Groover; Betty Formby; Matthew Anderson

[57] ABSTRACT

A method for the recognition of video standards, in which an up/down counter is used to detect the polarity of synchronization pulses. Specifically, a value representing a duration is memorized, a counting value (Q) is produced, this value being incremented when a binary synchronization signal (INCI) is in one state and decremented when this signal is in the other state, a comparison is made of the value representing the duration and the counting value, at a given time, of the synchronization signal, and a signal representing the standard is produced as a function of the result of the comparison. This method is implemented by a circuit comprising a microcontroller, a detection circuit producing a pick-up control logic signal (CAP), a counter producing a counting value (Q) and a register to load the counting value when the pick-up control signal is active.

35 Claims, 6 Drawing Sheets

FIG. 9a
FIG. 9b
FIG. 9c
FIG. 9d
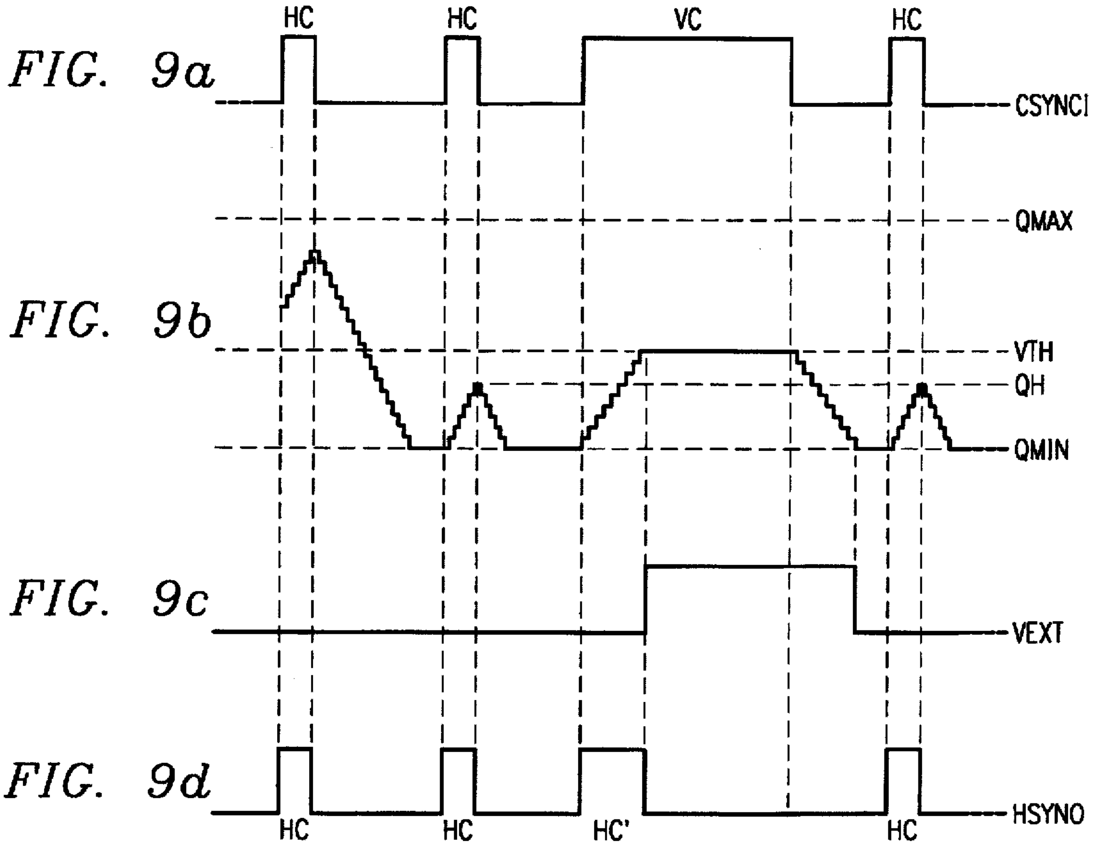
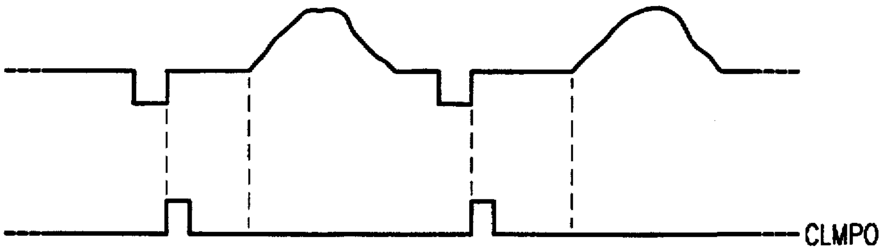
FIG. 10

METHOD FOR RECOGNITION OF VIDEO STANDARDS AND CIRCUIT IMPLEMENTING THIS METHOD

CROSS-REFERENCE TO RELATED APPLICATION

This application claims priority from French App'n 94-02557, filed Feb. 28, 1994, which is hereby incorporated by reference. However, the content of the present application is not necessarily identical to that of the priority application.

BACKGROUND AND SUMMARY OF THE INVENTION

The invention relates to a method for determining characteristics of synchronization signals and to a circuit implementing such a method. It can be applied in every field and, notably, in fields involving a display of images on a screen (such as a television or computer screen). In these fields, it will preferably be used for the processing of synchronization signals dedicated to the horizontal and vertical scanning of a display screen.

The invention shall be described in the context of the processing of video signals in data processing without this being possibly seen as any restriction whatsoever of the scope of the invention.

Horizontal scanning signals as well as vertical scanning signals are known among video signals used to display images on cathode-ray tube screens. The horizontal scanning signal is a signal applied to electrodes or deflection coils of one or more electron guns sending electrons from a cathode towards an electroluminescent screen. To form an image, the screen is thus scanned in order to form a certain number of lines stacked on top of one another from the top to bottom of the screen. This line is formed by a certain number of pixels, commonly called pixels, aligned beside one another.

The number of lines displayed on the screen and the number of pixels displayed per line varies according to the resolution of the screen and also according to the display protocols envisaged. Furthermore, the frequency of the refreshing of the images on the screen also depends on the standards used and on the qualities sought. For example, the VGA3 (Video Graphics Array) standard enables the display of 480 lines of 640 pixels, the screen refresh frequency being 60 Hz and the frequency of the lines being 31.5 kHz. The XGA (eXtended Graphics Arrays) standard enables the display of 768 lines of 1024 pixels, with a screen refresh frequency of 43.48 Hz and a line frequency of 35.52 kHz.

To enable a satisfactory display of an image, it is necessary, in addition to the information to be displayed that is transmitted in the form of electrical signals, to provide the deflection electrodes with synchronization signals in order to identify the line starting and the screen end.

There are therefore two types of synchronization signals: horizontal synchronization signals and vertical synchronization signals. These signals are pulse logic signals defined by three basic characteristics which are the polarity of their pulses (positive or negative), the recurrence frequency of these pulses and the period of these pulses.

Typically, the horizontal synchronization signals have pulses with a duration of some microseconds and a recurrence frequency of some tens of kiloHertz. The vertical synchronization signals have pulses with a duration of some tens of microseconds and a recurrence frequency of some tens of Hertz.

For one and the same standard, it is possible to have horizontal and vertical synchronization signals with identical or opposite polarities.

These synchronization signals are transmitted on separate transmission lines or one and the same transmission line. In the latter case, the term "composite signal" is used. This composite signal comprises both the vertical synchronization pulses and the horizontal synchronization pulses (MAC II standard, for example).

These synchronization signals are transmitted, depending on the standard, on the same transmission line as the video signal to be displayed or on separate lines. In the latter case, a transmission will be made, for example, of the horizontal synchronization signal on the same line as the video signal and of the vertical synchronization signal on a different line. If the synchronization signal is a composite one, it is possible to choose to use only one transmission line.

Depending on the standard used (VGA, XGA, etc.), the synchronization signals will have different given characteristics from one standard to the other.

In the screens, apart from the display equipment (electrodes etc.), there are electronic circuits whose purpose is to control this display equipment (for the production of the signals applied to the electrodes, distortion correction signals, gain control signals, etc.). A current trend is towards the integration, in the screens, of a programmable microcontroller to produce various control signals such as those described here above. This approach enables a greater flexibility of use (for example to enable the use of remote controls to adjust the display parameters).

Conventionally, the received signals are filtered to separate the video signals containing the information to be displayed and the synchronization signals.

Using the synchronization signals, a certain number of signals are produced. For example, it is necessary to separate the horizontal and vertical synchronization pulses should the received signal be a composite one. Furthermore, the electrical signals corresponding to the information elements to be displayed on a line are referenced with respect to a voltage level called a black level, this level being stable during a time interval between the end of the horizontal pulse corresponding to this line and the signal corresponding to the information to be displayed at the start of the line (typically, this time interval is an interval of 10 μs to 1 ms). There is therefore produced a pulse signal that enables the identifying of the time interval during which it is possible to measure the black level, so that the colors displayed on the screen are stable from one line to the other.

It has therefore been seen that the screen requires means for the production, from the received synchronized signal or signals, of synchronization signals that are compatible with the display equipment and various control logic or analog signals. These signals are a function of the standard used.

Hitherto, the signals were produced by the use of discrete circuits or ASICs (Application Specific Integrated Circuits), these signals being subsequently taken into account by the display equipment and, as the case may be, by a microcontroller. These circuits could or could not be used with various standards. These approaches have the drawback of being costly (in terms of cost of development) and of taking up much space (requiring two distinct circuits if a microcontroller and an ASIC are used).

For economic reasons, the manufacturers wish to develop so-called multistandard screens, that are low-cost and compact devices capable of displaying video signals based on different existing or future standards.

In the invention, it is sought to develop an integrated circuit (with a gain in space and cost) for the processing of the video synchronization signals that can be used without being constrained by the prior knowledge of the video signal standard or standards that will have to be displayed and that could be adapted, in the future, to any standard that might appear (i.e. a circuit that is a multistandard device).

It is therefore proposed to develop an integrated circuit comprising both a microcontroller of the kind found in screens and the means needed to recognize the standard that is being used and produce the appropriate signals.

A circuit such as this should therefore offer the following functions:

- the detection of the presence of one or more composite or monofrequency type synchronization signals,
- the determining of the polarity or polarities of the synchronization signal or signals received,
- the determining of the frequency and duration of the pulses of the synchronization signals received,
- the determining of the standard used on the basis of the above information elements,
- the extraction of the vertical and horizontal synchronization signals from a composite synchronization signal,
- the generation of a pulse signal enabling the synchronizing of a black level acquisition.

With regard to the frequency of the pulses, a standard procedure is to determine this frequency by means of a microcontroller comprising a counter producing two counting values that correspond to a start and to an end of a period. In the invention, it will be striven more particularly to obtain other functions by seeking to minimize the work load of the microcontroller.

The invention is aimed at providing a method for the recognition of video standards, wherein:

- a value representing a duration is memorized,
- a counting value is produced, this value being incremented when a binary synchronization signal is in one state and decremented when this signal is in the other state,
- a comparison is made of the value representing the duration and the counting value, at a given time, of the synchronization signal,
- and a signal representing the standard is produced as a function of the result of the comparison.

Thus the operations of the detection of polarity, the measurement of pulse duration and the extraction of signals from a composite signal will be carried out.

The polarity and the duration of the pulses could be determined simultaneously. The comparison will be done typically by the microcontroller which will be suitably programmed.

Depending on the function envisaged, the signal produced will represent one characteristic of the standard used (polarity information for example) or the standard itself (all the characteristics, namely polarity, frequency, pulse width, etc.).

The invention is also aimed at defining a circuit for the implementation of the above-described method.

The invention therefore relates to a circuit for the recognition of video standards, said circuit comprising:

- at least one input terminal to receive a synchronization input signal, one output terminal to give a synchronization output signal, a microcontroller,
- a detection circuit receiving, at one input, the synchronization input signal and comprising means for the production, firstly, of an internal synchronization signal delayed with respect to the synchronization input signal and, secondly, a pick-up control logic signal,
- a counter having its is set by a counting clock signal and producing a counting value that is incremented or decremented depending on the state of the internal synchronization signal, this counting value being accessible by a parallel output port of the counter,
- a register comprising a parallel input/output port to load the counting value when the pick-up control signal is in a so-called active state.

When an edge is detected on a synchronization signal, a counting value will be loaded into a register, the loading being done at the start or at the end of a pulse depending on the type of edge detected and the polarity of the signal. The counting value represents the duration of the pulses and hence their polarity because a pulse may be characterized by a change in state that is temporary and short as compared with the duration of the period corresponding to the recurrence frequency of the pulses.

In a preferred embodiment, the circuit will include a control circuit for the comparison of the counting value with minimum and maximum thresholds so that this counting value is blocked or held if a threshold is reached and so that the input signal is at the high or low level. It will be enough to load a value corresponding to one of the thresholds into the register before implementing the edge detection procedure. Depending on whether, after the loading of the counting value into this register, the value contained in the register is identical to or different from the initially loaded value, it will be deduced therefrom that the signal has a positive or negative polarity.

With regard to the extraction of signals, the counting value will be compared to a value programmed and loaded into the register. The programmed value will represent a duration greater than the duration of a horizontal synchronization pulse. When the counting value is equal to this programmed value, it will be deduced therefrom that there is a vertical synchronization pulse, it being understood that this vertical synchronization pulse is differentiated from a horizontal synchronization pulse by a greater duration.

BRIEF DESCRIPTION OF THE DRAWING

The disclosed inventions will be described with reference to the accompanying drawings, which show important sample embodiments of the invention and which are incorporated in the specification hereof by reference, wherein:

The invention will be understood more clearly from the following description and from the accompanying figures. These figures are given purely by way of an indication and in no way limit the scope of the invention. Of these figures:

FIGS. 9a to 9d show the composite signal, the progress of the contents of the counter with respect to the state of this signal, the vertical and horizontal synchronization signals extracted from the composite signal, FIG. 10 shows a video signal and the illustration of an associated black level reference signal.

DETAILED DESCRIPTION OF THE PREFERRED EMBODIMENTS

Figure 1:
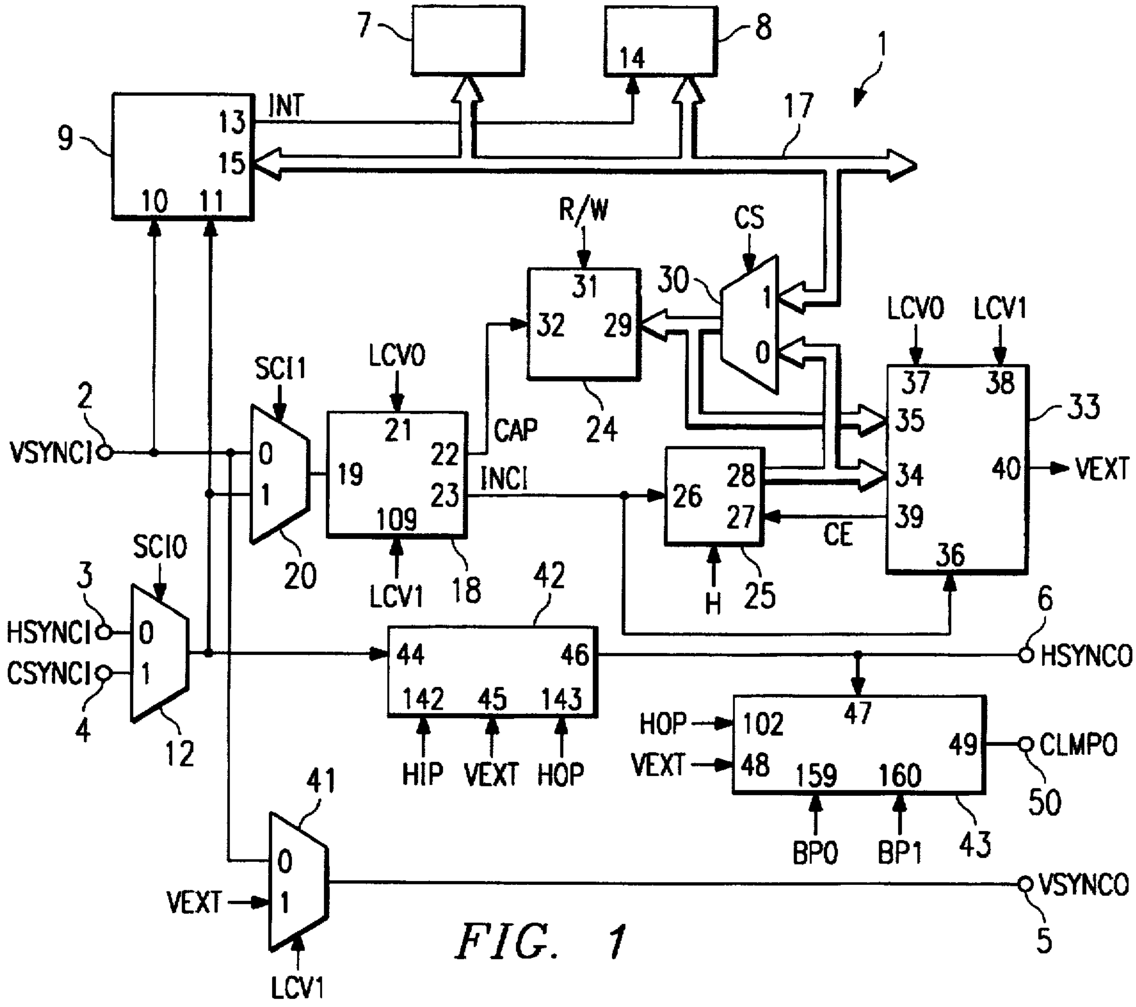
FIG. 1 shows a circuit enabling the determining of the characteristics of a video synchronization signal in order to determine which protocol is used.

The numerous innovative teachings of the present application will be described with particular reference to the presently preferred embodiment (by way of example, and not of limitation), in which:

FIG. 1 exemplifies a circuit 1 made according to the invention.

It has three input terminals 2, 3 and 4 to receive one or more synchronization signals.

There are indeed two possibilities with respect to the video synchronization: 1) the use of a vertical synchronization signal and a horizontal synchronization signal (the so-called monofrequency mode), or 2) the use of a single synchronization signal, called a composite signal, for the vertical synchronization and the horizontal synchronization (the so-called two-frequency mode).

A vertical or horizontal synchronization signal is a binary signal formed by pulses. It is characterized by a polarity, a pulse width (duration) and a frequency of recurrence of the pulses.

A composite synchronization signal is also a binary signal formed by pulses. It is characterized by a polarity, two pulse widths (duration) depending on whether the pulses are used for the vertical or horizontal synchronization, and two pulse recurrence frequencies depending on whether the pulses are used for the vertical synchronization or the horizontal synchronization.

Hereinafter in the description:

- the input terminal 2 is dedicated to the reception of vertical synchronization signals VSYNCI,
- the input terminal 3 is dedicated to the reception of horizontal synchronization signals HSYNCI,
- the input terminal 4 is dedicated to the reception of composite synchronization signals CSYNCI.

Figure 7A:
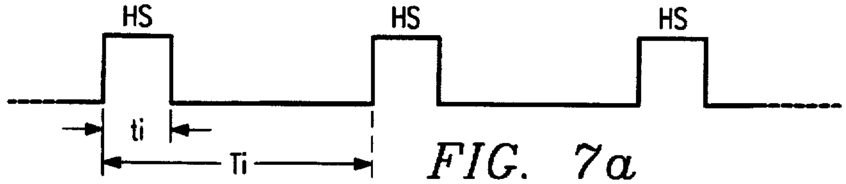
FIGS. 7a and 7b show a monofrequency synchronization signal and a composite signal.
Figure 7B:
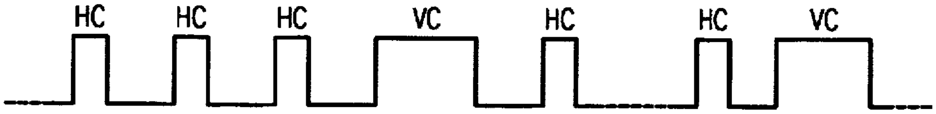

FIGS. 7a and 7b show positive polarity synchronization signals.

The polarity is said to be positive if the signal is at a logic level 1 for the duration of the pulses and is said to be at the logic level 0 for the rest of the time. If not, it is said to be negative.

A synchronization signal will be said to be active for the duration of the pulses. Otherwise it will be said to be inactive.

In practice, for the horizontal synchronization signals (as shown in FIG. 7a), the pulses HS have a duration ti of the order of 1 to 4 microseconds and a recurrence frequency of the order of 15 to 30 µs. A synchronization signal is therefore inactive for about 90% of the duration of the period Ti corresponding to the recurrence frequency.

For a vertical synchronization signal, a pulse has a duration of the order of 40 to 100 µs for a period with a duration of 10 to 15 ms.

A composite signal, shown in FIG. 7b, comprises pulses HC of the horizontal type (with a duration of some microseconds, and a frequency of some kilohertz) and vertical type pulses VC (with a duration of some tens of microseconds and a frequency of some Hertz).

The circuit furthermore includes two output terminals 5 and 6.

The output terminal 5 gives a vertical synchronization signal VSYNCO. The signal VSYNCO is either the signal VSYNCI (monofrequency mode) or a vertical synchronization signal VEXT produced from the vertical synchronization pulses of the composite signal CSYNCI.

The output terminal 6 gives a horizontal synchronization signal HSYNCO. The signal HSYNCO is either the horizontal synchronization signal HSYNCI, or a horizontal synchronization signal HEXT, produced from the horizontal synchronization pulses of the composite signal CSYNCI.

The aim of the circuit 1 is to:

- detect the presence of one or more synchronization signals on the input terminal or terminals 4 or 2 and 3,
- recognize these signals by comparison with standard synchronization signals memorized in a memory 7 connected by means of a data bus 17 to a microcontroller 8, all three being included in the circuit,
- provide, for the processing of the display of the information elements on the standard detected and, possibly, in the case of a composite signal, horizontal and vertical synchronization signals,
- give a control signal enabling other circuits to acquire the black level of the signals to be displayed.

To do this, the circuit 1 has a first counter 9 that has its rate set by a clock circuit CK having two inputs 10 and 11. The input 10 is connected to the input terminal 2. The input 11 is connected to the output of a multiplexer 12. This multiplexer 12 has two inputs connected to the input terminals 3 and 4 and one control input to receive a selection logic signal SCIO from the microcontroller 8. If SCIO=0, the output of the multiplexer 12 is connected to the input terminal 3. If SCIO=1, this output is connected to the input terminal 4.

Although the counter 9 is shown in a distinct way with respect to the microcontroller 8, it will be, in practice, an internal peripheral of this microcontroller 8. Indeed, any microcontroller has a counter. It is possible however to choose to use a counter 9 external to the microcontroller 8 so as to use it only to determine the characteristics of one or more synchronization signals and not for any tasks internal to the microcontroller 8.

The first counter 9 has an output 13 connected to an interruption input 14 of the microcontroller 8 and a parallel output port 15 connected to a parallel input/output port 16 of the microcontroller 8 by means of the data bus 17.

This first counter 9 counts in natural binary counting mode. In one example, it will be formed by eight cascaded cells. In a standard way, it gives the microcontroller 8 an interruption signal INT and, as the case may be, a counting value C (in one example C is encoded on 8 bits C0 to C7) when an edge is detected on one of the inputs 10 and 11. It will be assumed that the interruption signal is produced on a leading or trailing edge of the synchronization signals VSYNCI, HSYNCI or CSYNCI.

This first counter 9 enables the detection of the presence of synchronization signals on one or two of the input terminals. Indeed, in a standard way, it induces a procedure for the management of interruption of the microcontroller when it detects an edge on one of its inputs.

This presence can also be detected by connecting the input terminals to inputs of the microcontroller. It will be enough to make regular readings of the state of these inputs, with a change in state implying the presence of a synchronization signal on at least one of the input terminals. This method has the drawback of mobilizing the resources of the microcontroller and is therefore not recommended. Indeed, this microcontroller is used concretely to control all the circuits used to manage the display.

With regard to the processing of the interruption signal INT, care will be taken to connect it to an interruption input 14 that can be inhibited (i.e. that does not automatically imply a sequence to manage the interruption of the microcontroller 8). Indeed, the synchronization signals are periodic and regular interruptions would penalize the management of the microcontroller 8 (through an increase in the time needed to carry out a given task).

The first counter 9 is also used in a standard way to measure the recurrence frequency of the synchronization pulses. In practice, the recurrence frequency of the horizontal synchronization pulses will be computed, whether they are included in a composite signal or whether they are alone (monofrequency mode). Thus, a computation will be made of the fastest frequency thus enabling a gain in time. In the case of a composite signal, care will be taken to make several successive measurements in order to overcome the effects of errors due to the presence of vertical synchronization pulses in the composite signal. It is possible, nevertheless, to measure the frequency of the vertical synchronization pulses, if this is necessary, in the determining of a standard.

To make the measurement, the microcontroller reads and memorizes the value of C during a leading edge or trailing edge. Then it memorizes the value of C on an edge of the following same type. With the clock frequency of the first counter 9 being known, it is possible to compute the recurrence frequency of the synchronization pulses processed. Since this type of procedure is a standard one, it shall not be described in greater detail.

One problem could arise owing to the high frequency (some tens of kiloHertz) of the horizontal synchronization pulses. So as to not to produce a large number of interruptions of the microcontroller, it could be chosen to reduce the frequency of the pulses received by the counter 9. The simplest approach is to connect the output of the multiplexer 12 to the input 11 of the counter 9 by means of a frequency divider. In one example, it is also possible to set the rate of the counter by means of a clock signal CK coming from the microcontroller (at 4 Mhz in one example) and to use a frequency divider dividing the frequency by a factor 256. This also makes it possible to carry out more precise measurements.

The circuit 1 also has a detection circuit 18. This detection circuit 18 has an input 19 connected to the output of a two-input multiplexer 20. The inputs of this multiplexer 20 are connected respectively to the input terminal 2 and to the output of the first multiplexer 12. The multiplexer 20 has one control input to receive a selection logic signal SCI1 from the microcontroller. If SCI1=0, the output of the multiplexer 20 is connected to the input terminal 2. If SCI1=1, this output is connected to the output of the multiplexer 12.

The detection circuit 18 furthermore has:

- an input 21 to receive a sensitivity logic signal LCV0 from the microcontroller 8,
- an input 109 to receive an acquisition/extraction logic signal LCV1 from the microcontroller 8,
- an output 22 to give a pick-up control logic signal CAP,
- an output 23 to give an internal synchronization signal INCI corresponding to the synchronization signal received at the input 19 with a certain delay.

This detection circuit 18 typically has a leading edge detector and a trailing edge detector. It works as follows:

- the pick-up signal CAP is said to be active if it is at 1 and inactive if it is at 0,
- if LCV0=0 and LCV1=0, then CAP=1 when a trailing edge is detected at the input 19 of the detection circuit,
- if LCV0=1 and LCV1=0, then CAP=1 when a trailing edge is detected, else CAP=0.

It will be said that the acquisition/extraction signal is active if LCV1=1 and inactive if LCV1=0.

Figure 6:
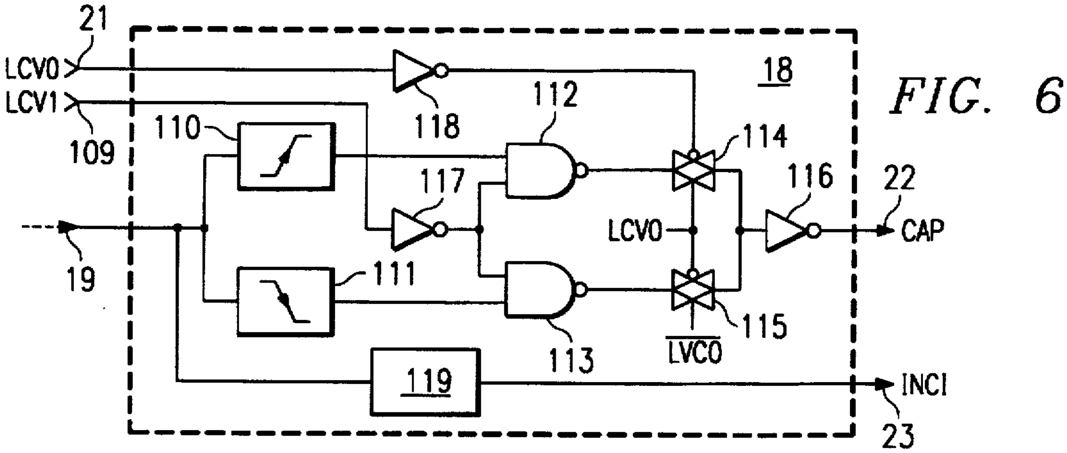
FIG. 6 shows a detection circuit.

A schematic embodiment is shown in FIG. 6.

The input 19 of the detection circuit 18 is connected to an input of a leading edge detector 110 and to an input of a trailing edge detector 111. These edge detectors 110 and 111, which besides are standard devices, are not described. Each of these edge detectors 110 and 111 has an output. These edge detectors 110 and 111 will be chosen in such a way that, at their respective outputs, they produce a level 1 logic signal when they detect an edge or else a level 0 logic signal.

The output of the edge detector 110 is connected to the input of a two-input NAND gate 112. The other input of this NAND gate 112 is connected to the output of an inverter 117 whose input is connected to the input 109.

The output of the edge detector 111 is connected to the input of a two-input NAND gate 113. The other input of this NAND gate 113 is connected to the output of the inverter 117.

The output of the NAND gate 112 is connected to the input of MOS switch 114. The control gate of the P type transistor of this switch 114 is connected to the output of an inverter 118 whose input is connected to the input 21. The control gate of the N type transistor of the switch 114 is connected to the input 21.

The output of the NAND gate 113 is connected to the input of a MOS switch 115. The control gate of the N type transistor of this switch 115 is connected to the output of the inverter 118. The control gate of the P type transistor of the switch 115 is connected to the input 21.

Naturally, the notions of switch input and output that shall be referred to again hereinafter are purely functional.

The outputs of these switches 114 and 115 are connected to the input of an inverter 116 whose output corresponds to the output 22 of a detection circuit 18.

Furthermore, the input 19 of the detection circuit 18 is connected to the output 23 of this circuit 18 by means of a delay flip-flop circuit 119.

The capture signal CAP is used for the selective loading, into a register 24, of a counting value Q when a leading or trailing edge is detected on the synchronization signal present at the input 19 of the detection circuit 18.

The circuit 1 has a second counter 25 whose rate is set by a counting clock signal H. It has an input 26 to receive the internal synchronization signal INCI, a count enable input 27 to receive a count enable logic signal CE and a parallel output port 28.

It is this second counter 25 that produces the counting value Q. This counter 25 makes a count in a natural binary language if CE=1, else it is off (CE=0).

It increments or decrements the counting value Q depending on the state of internal synchronization signal INCI.

If INCI=1, then it increments Q.

If INCI=0, then it decrements Q.

The register 24 comprises:

a parallel input/output port 29 connected by means of a multiplexer 30 either to the parallel output port 28 of the counter 25 or to the data bus 17, a read/write control input 31 to receive, from the microcontroller 8, a read/write control logic signal R/W and a capture control input 32 to receive the capture signal CAP from the detection circuit 18.

The reference CV shall be given to the value contained in the register 24.

The multiplexer 30 receives, from the microcontroller 8, at a control input, a selection logic signal CS to connect the parallel port 29 of the register 24 to the bus 17 (CS=1) or to the parallel output port 28 of the second counter 25 (CS=0).

When CS=1, it will be assumed that the microcontroller reads the contents of the register 24 if R/W=0 and writes in this register 24 if R/W=1.

The circuit 1 also has a control circuit 33.

This control circuit 33 has:

a parallel input port 34 to receive the counting value Q from the counter 25, a parallel input port 35 to receive the contents CV of the register 24, an input 36 to receive the internal synchronization signal INCI, two inputs 37 and 38 to receive, from the microcontroller 8, the sensitivity signal LCV0 and the acquisition/extraction signal LCV1, an output 39 to give the count enable signal CE to the counter 25.

This control circuit 33 enables the comparison of the counting value Q with minimum threshold values QMIN and maximum threshold values QMAX and the holding respectively of the incrementation or decrementation of Q if the maximum or minimum threshold is reached by giving CE=0 to the counter 25.

This control circuit 33 also has an output 40 to give the vertical synchronization signal VEXT from a composite synchronization signal CSYNCI.

The circuit 1 also has an output multiplexer 41, an output circuit 42 and a latch circuit 43.

The output multiplexer 41 has two inputs. One input is connected to the input terminal 2. The other input is connected to the output 40 of the control circuit 33. The multiplexer 41 also receives the acquisition/extraction signal LCV1.

This output multiplexer 41 has an output connected to the output terminal 5.

If LCV1=0, then VSYNCO=VSYNCI (the case where the received signals are monofrequency signals).

If LCV1=1, then VSYNCO=VEXT (where the received signal is composite).

The output circuit 42 has an input 44 connected to the output of the multiplexer 12, an input 45 connected to the output 40 of the control circuit 33 and an output 46 connected to the output terminal 6.

The latch circuit 43 has an input 47 connected to the output terminal 6, an input 48 connected to the output 40 of the control circuit 33 and an output 49 connected to an output terminal 50 to give a black level reference pulse signal CLMPO.

After this brief description of the circuit 1, its operation shall now be described.

As seen here above, the detection of the presence of one or two synchronization signals on one or two input terminals is done by means of a first counter 9. Similarly it is possible, by means of this counter 9, to measure a pulse recurrence frequency.

The points that remain to be considered are the detection of polarity, the measurement of pulse width, the extraction of two signals, namely the vertical and the horizontal synchronization signals, from a composite signal and the production of the black level reference signal CLMPO.

The detection of polarity is done in three steps as follows:

1) the writing, from the microcontroller 8, of a given value in the register 24, 2) the loading, into this register 24, of the counting value Q of the counter 25, 3) the reading of the value loaded from the counter 25 and comparison with the value initially loaded from the microcontroller 8.

In one example, the counter 25 is a five-bit counter. The register 24 therefore has at least five storage flip-flops. It may have more of them and may be used to store control signals such as LCV0, LCV1 for example. In practice, this is the case since the parallel input/output port 29 of this register 24 is connected through the multiplexer 30 to a data bus 17 of the microcontroller 8. Now this data bus 17 has, conventionally, 8 bits (in the case of a standard 8-bit microcontroller).

The counter 25 is capable of counting between two values QMIN and QMAX. In one example, QMIN=00000 (=00 in hexadecimal language) and QMAX=11111 (=1F).

In practice, to determine the polarity of a synchronization signal, the microcontroller 8 writes the value QMIN or the value QMAX in the register 24. To do this, it gives CS=1 to the multiplexer 30 and R/W=1 to the register 24.

Then it fixes CS=0 and LCV0=0 if CV=QMIN or LCV0=1 if CV=QMAX.

In the former case, the detection circuit 18 gives CAP=1 to the register 24 when a leading edge appears at its input 19, or else CAP=0.

In the latter case, the detection circuit 18 gives CAP=1 to the register 24 when a trailing edge appears at its input 19, or else CAP=0.

FIGS. 8*a* to 8*d* illustrate the development of the value Q of the counter as a function of the synchronization signal INCI received at the input 26 of the counter 25.

Figure 8A:
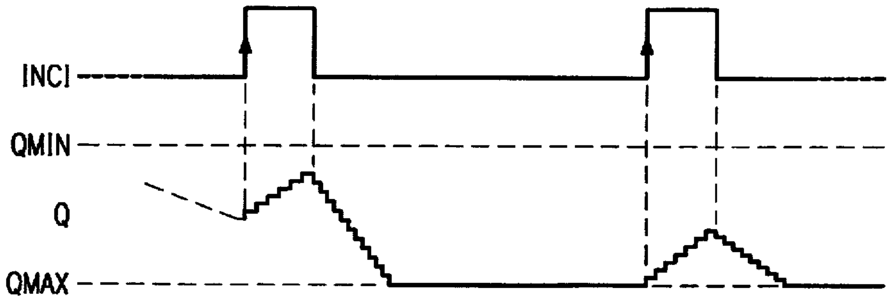
FIGS. 8a to 8d show polarity signals and the development of the contents of a counter with respect to the state of a control signal.
Figure 8B:
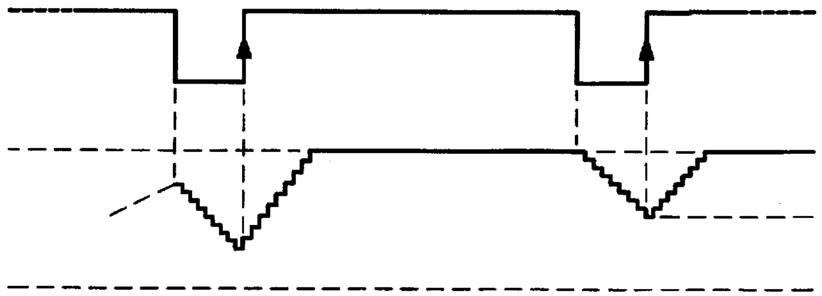
Figure 8C:
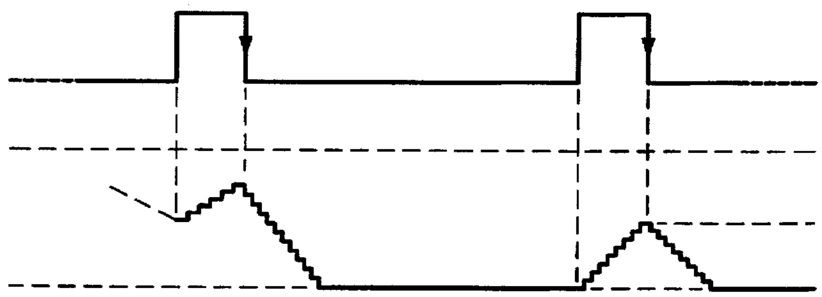
Figure 8D:
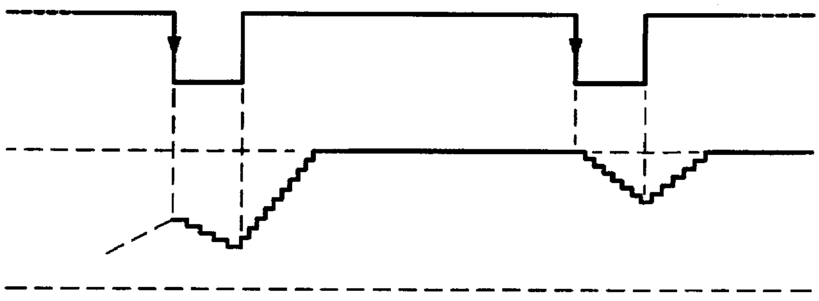

In FIGS. 8*a* and 8*c*, the synchronization signal INCI has a positive polarity. In FIGS. 8*b* and 8*d*, it has a negative polarity.

In FIGS. 8*a* and 8*b*, the value Q of the counter 25 is loaded into the register 24 when a leading edge appears at the signal INCI. In FIGS. 8*c* and 8*d*, the value Q of the counter 25 is loaded into the register 24 when a trailing edge appears at the signal INCI.

In principle, the value Q of the counter is not known when a first edge appears on the signal INCI.

A counting clock frequency H is chosen such that Q cannot go from QMIN to QMAX or conversely for the duration of a pulse. The value Q may take 32 different discrete values (Q is encoded on five bits Q0 to Q4).

In view of the respective pulse durations, it is possible to use a counting clock frequency H of 4 Mhz for example (identical to CK) for horizontal synchronization pulses. Indeed, it would then be necessary to have 32*250 ns, giving 8 μs so that Q passes from QMIN to QMAX or conversely. Now, in practice, the horizontal synchronization pulses have a duration that, at present, does not exceed 4 μs.

For vertical synchronization pulses, this counting clock frequency H is too fast. It is possible to generate a slower frequency by dividing this frequency by means of a frequency divider selected by the selection signal SCI1 (division if SCI1=0, 4 Mhz frequency if SCI1=1). For example, it is possible to use a frequency divider by a fixed factor of 256. It would then be necessary to have 32 * 64 μs, giving 2,048 ms, so that Q goes from QMIN to QMAX or conversely. This is compatible with the standard values of vertical pulse duration.

For a composite signal, it will be chosen preferably to use the fastest counting clock frequency H and to detect the polarity of the horizontal synchronization pulses, given that a composite signal has only one polarity. This makes it possible to reduce the detection time.

Depending on whether the signal has a positive or negative polarity, the value Q will reach QMIN or QMAX for the duration when the synchronization signal INCI is inactive (the time between the end of the synchronization pulse and the start of the next synchronization pulse).

The control circuit 33 (described hereinafter) is arranged in such a way that Q can go from QMAX to QMIN only by decrementing and not directly. Thus, whatever may be the value of Q at the start of the synchronization pulse, starting from the next synchronization pulse, the value of Q will be equal to a given value on the leading pulse edges (QMIN if the polarization is positive) and at another value on the trailing pulse edges (QMAX if the polarity is negative).

If the synchronization signal INCI has a positive polarity then, on the leading edges of the pulses, Q=QMIN=00. On the trailing edges, Q is different from QMIN (Q>QMIN).

If the synchronization signal INCI has negative polarity then, on the trailing edges of the pulses, Q=QMAX=1F. On the leading edges, Q is different from QMAX (Q<QMAX).

It is enough for the microcontroller 8 to read the value of CV to determine whether the polarity is positive or negative. If CV=QMAX has been written in the register 24 and if Q is loaded into the register 24 on a trailing edge, CV is unchanged if the polarity is negative (or else it is positive). Similarly, if CV=QMIN has been written and if Q is loaded on a leading edge in the register 24, the polarity is positive if CV is unchanged (else it is negative).

The advantage of carrying out the reading and comparison of CV with the value initially written in the register 24 by means of the microcontroller 8 is that it enables several readings and comparisons before a decision on the polarity of the synchronization signal INCI.

In the case of a composite signal, care will be taken to make several readings of the register 24 in order to overcome the problem of the reading of erroneous values due to the presence of vertical synchronization pulses (having durations greater than those of the horizontal synchronization pulses). Indeed, Q will go from one extreme to the other when the synchronization signal is active (if the counting clock signal H has a fast frequency of course).

It is possible nevertheless to use logic type comparison circuits of the kind found in the control circuit 33.

Owing to the delay of INCI with respect to the synchronization signal VSYNCI, HSYNCI or CSYNCI present at the input 19 of the detection circuit 18, it is certain that the loading of Q into the register 24 is done at a moment prior to the edges of the pulses. This ensures that a value always different from QMIN or QMAX is not loaded into the register 24.

Furthermore, care will be taken to deactivate the pick-up signal CAP when the microcontroller gains access to the register 24 by means of the data bus 17.

It is possible, as desired, to provide for an additional control signal for the register 24 that inactivates the signal CAP, and to multiplex the signals R/W and CAP, select them by means of the signal CS and inactivate CAP at the detection circuit by means of the signal CS.

Once the polarity of the pulses is defined, the microcontroller can easily measure the duration of these synchronization pulses. It is enough to fix the state of LCV0 such that the value of Q loaded into the register 24, when an edge is detected, is different from QMIN or QMAX. A corresponding edge is then detected at the end of a pulse. If the polarity is positive, the loading will be done on a trailing edge. If the polarity is negative, the loading will be done on a leading edge. It is then enough to multiply the value of Q read in the register 24 by the time needed for the counter 25 to increment or decrement Q by one unit, the frequency of the counting clock signal H being known.

Figure 3:
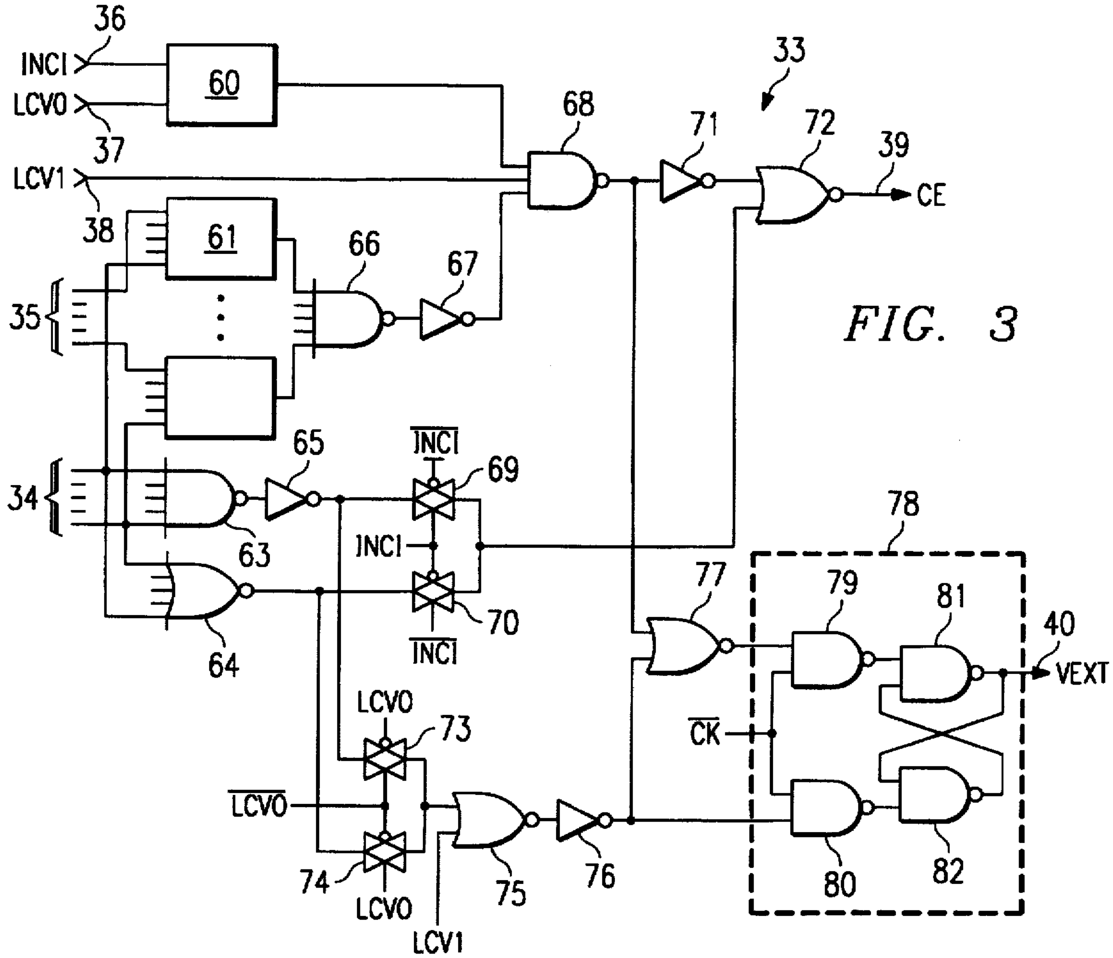
FIG. 3 shows a control circuit designed to validate or not validate a counting operation in a counter and to give a vertical synchronization signal extracted from a composite synchronization signal.

FIG. 3 illustrates a possible embodiment of the control circuit 33.

For the comparison of Q with QMIN (00) and QMAX (1F), this circuit includes a NAND gate 63 and a NOR gate 64. Schematically, these gates 63 and 64 are represented with five inputs. The inputs of these gates 63 and 64 are connected to the parallel input port 34 of the control circuit 33. The NAND gate 63 therefore receives the value Q (Q0 to Q4) at its inputs. This is also the case with the NOR gate 64.

The output of the NAND gate 63 is connected to the input of an inverter 65. The output of this inverter 65 is connected to the input of a MOS switch 69. The control gate of the N type transistor of the switch 69 is connected to the input 36 (which receives the internal synchronization signal INCI). The control gate of the P type transistor of the switch 69 is connected to this same input via an inverter (not shown) and therefore receives/INCI.

The output of the NOR gate 64 is connected to the input of a MOS switch 70. The control gate of the P type transistor of the switch 70 is connected to the input 36 (which receives INCI). The control gate of the N type transistor of the switch 70 receives/INCI.

The outputs of the switches 69 and 70 are connected to the input of a two-input NOR gate 72. The output of the NOR gate 72 corresponds to the output 39 of the control circuit 33. This gate 72 therefore gives the count enable signal CE.

Thus, if Q=QMIN and if the synchronization signal INCI is in the low state, the counter 25 is held at Q=QMIN (CE=0).

Similarly, if Q=QMAX and if the synchronization signal INCI is in the high state, the counter 25 is held at Q=QMAX (CE=0).

In the case of a composite synchronization signal CSYNCI, the duration of the horizontal synchronization pulses will be measured. This makes it possible subsequently to extract the vertical synchronization signal VEXT and the synchronization signal HSYNCO from this composite signal CSYNCI.

To do this, the control circuit 33 and the output circuit 42 are used as follows:

1) with the polarity of the composite signal and the duration of the horizontal synchronization pulses being known, a binary threshold value VTH is fixed, encoded on the same number of bits as Q, such that:

if the polarity is positive (with a leading edge at the start of the pulse), VTH represents a duration greater than or equal to the duration needed for the counter 25 to increment Q for the duration of a horizontal synchronization pulse, if the polarity is negative (with the trailing edge at the start of the pulse), VTH represents a duration greater than or equal to the duration needed for the counter 25 to decrement Q for the duration of a horizontal synchronization pulse.

By means of the drawings 9*a* to 9*d*, we shall describe an extraction of the signals VEXT and HSYNCO from a composite signal.

FIG. 9*a* shows a composite synchronization signal CSYNCI having positive polarity, formed by horizontal synchronization pulses HC and vertical synchronization pulses VC.

In principle, the value Q is not known and the counting clock frequency H used is the fast frequency (4 Mhz in the example).

FIG. 9*b* shows the progress of the value Q.

As was seen during the description of the detection of polarity, Q will get stabilized at Q=QMIN when the horizontal synchronization signals are inactive (between the end of a pulse HC and the start of the next pulse) and at a given value QH>QMIN at the end of the horizontal synchronization pulses HC.

The threshold VTH is fixed such that VTH>QH. When Q is lower than VTH, the control circuit 33 produces a low-level extracted vertical synchronization signal VEXT (state 0, inactive) at its output 40 (FIG. 9*c*).

When a vertical synchronization pulse VC appears, Q is incremented between QMIN and VTH. When Q=VTH, the control signal 33 holds the counter (CE=0) and simultaneously the signal VEXT goes to the state 1 (active).

At the end of the vertical synchronization pulse VC (trailing edge), Q is decremented. When Q=QMIN, the extracted vertical synchronization signal VEXT is deactivated (0, inactive).

In practice, it is necessary that the time interval between the end of a vertical synchronization pulse and the start of the next horizontal synchronization pulse should be big enough to enable Q to go from VTH to QMIN. This makes it necessary not to fix a threshold value VTH that is excessively higher than QH.

Furthermore, there is a delay of the extracted vertical synchronization signal VEXT with respect to the vertical synchronization signal included in the composite signal CSYNCI. In practice, this is not troublesome for the user since it corresponds to a refreshing of the screen that is slightly delayed but not perceptible to the human eye. However, it would be useful to fix a threshold VTH that is as close as possible to QH to limit this delay.

A description shall be given here below of the rest of the control circuit 33.

Figure 2:
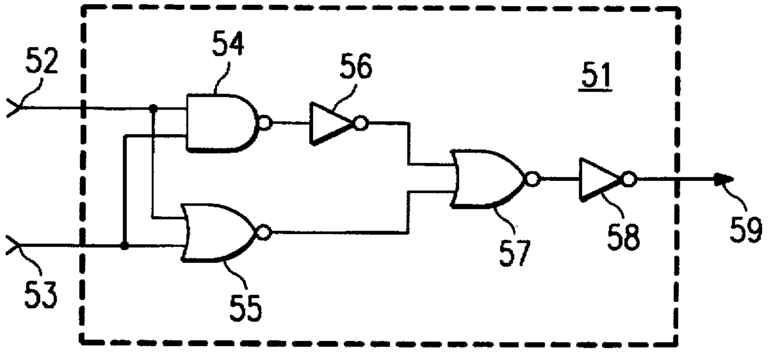
FIG. 2 shows a circuit designed to compare two binary signals and find out if they are equal (in the same state) or different (in different states)

FIG. 2 illustrates an embodiment of a comparison circuit 51. It has two inputs 52 and 53 to receive two logic signals The two inputs 52 and 53 are connected to two inputs of a two-input NAND gate 54 and two inputs of a two-input NOR gate 55. The output of the NAND gate 54 is connected to the input of an inverter 56. The output of this inverter 56 is connected to an input of a two-input NOR gate 57. The other input of this NOR gate 57 is connected to the output of the NOR gate 55. The output of the NOR gate 57 is connected to the input of an inverter 58. The output of this inverter 58 is connected to an output 59 of the comparator circuit 51.

The logic signal at the output 59 is therefore in the state 1 if the logic signal present at the inputs 52 and 53 are in the same state, or else it is in the state 0.

The control circuit 33 has a comparison circuit 60 of the same type as the above-described comparison circuit 51. The inputs of this comparator are connected to the inputs 36 and 37 of the control circuit 33 and therefore receive, firstly, the synchronization signal INCI and, secondly, the sensitivity signal LCV0. The output of this comparator 60 is connected to an input of a three-input NAND gate 68. Another input of this NAND gate 68 is connected to the input 38 of the control circuit 33 and therefore receives the acquisition/extraction signal LCV1.

The control circuit 33 also has five other comparison circuits 61. The inputs of these comparison circuits 61 are connected to the parallel input ports 34 and 35 in such a way that each comparison circuit 61 compares a bit of CV with the corresponding bit of Q (CV being encoded on five bits CV0 to CV4). Thus, CV0 is compared to Q0, CV1 to Q1 etc. The outputs of these five comparison circuits 61 are connected to the inputs of a 5-input NAND gate 66 (this is a schematic depiction). The output of this NAND gate 66 is connected to the input of an inverter 67 whose output is connected to the last input of the NAND gate 68. The output of this NAND gate 68 is connected to the input of an inverter 71 whose output is connected to the other input of the NOR gate 72.

Thus, the control circuit can be used to hold the counter 25 when the following occur together:

- an active synchronization signal INCI (the action of the comparison circuit 60)
- Q=CV=VTH
- LCV1=1.

The first condition enables the counter 25 not to remain blocked if Q reaches the threshold VTH while the signal INCI is inactive.

For example, it could happen that Q>VTH at the time when system goes into extraction mode while the signal INCI has a positive polarity (FIG. 9*b*). For the extraction to be efficient, it is necessary that Q should be able to cross the threshold VTH (and therefore become lower than VTH) when the signal INCI is inactive.

To generate the vertical synchronization signal VEXT, the control circuit 33 is arranged as follows.

It has two MOS switches 73 and 74.

The input of the MOS switch 73 is connected to the output of the inverter 65. The control gate of the P type transistor of this switch 73 is connected to the input 37 and receives the sensitivity signal LCV0. The control gate of the N type transistor of this switch 73 is connected to the input 37 by means of an inverter (not shown) and receives the signal/LCV0.

The input of the MOS switch 74 is connected to the output of the NOR gate 64. The control gate of the N type transistor of this switch 74 is connected to the input 37 and receives the sensitivity signal LCV0. The control gate of the P type transistor of this switch 73 receives the signal/LCV0.

The outputs of these switches 73 and 74 are connected to an input of a two-input NOR gate 75. The other input of this NOR gate 75 is connected to the input 38 by means of an inverter (not shown) and receives the acquisition/extraction signal/LCV1. The output of the NOR gate 75 is connected to the input of an inverter 76 whose output is connected to an input of a two-input NOR gate 77. The other input of this NOR gate 77 is connected to the output of the NAND gate 68.

The output of the NOR gate 77 is connected to an input of a two-input NAND gate 79. The output of the inverter 76 is connected to an input of a two-input NAND gate 80. The other inputs of the NAND gates 79 and 80 receive the clock signal/CK. The output of the NAND gate 79 is connected to an input of a two-input NAND gate 81 whose output corresponds to the output 40 of the control circuit 33. The output of the NAND gate 80 is connected to an input of a two-input NAND gate 82. The second input of the NAND gate 82 is connected to the output of the NAND gate 81. The second input of the NAND gate 81 is connected to the output of the NAND gate 82. The set of NAND gates 79 to 82 therefore forms a flip-flop 78.

It will be observed that the signal VEXT produced is always a positive polarity signal. It is possible to choose to invert it or not invert it, this function being proposed hereinafter in the description when the inverter circuit 117 illustrated in FIG. 12 will be dealt with.

The extracted synchronization signal VEXT always has the same pulse width and the same pulse recurrence frequency as the synchronization signal INCI and is activated only when INCI has vertical synchronization pulses.

As for the horizontal synchronization signal HSYNCO extracted from the composite signal CSYNCI and given by the output circuit 42, it is illustrated in FIG. 9*d*.

When this output circuit 42 receives a horizontal synchronization signal HSYNCI at its input 44 (SCI0=0), it reproduces this signal faithfully. If this were to be the case also when it received a composite signal CSYNCI (SCI0=1), it would produce an inadequate horizontal synchronization signal including unwanted vertical synchronization pulses. The output circuit 42 is therefore arranged to inactivate the signal HSYNCO given at its output 46 (connected to the output terminal 6) when the extracted vertical synchronization signal is active. The synchronization signal HSYNCO will therefore include the horizontal synchronization pulses HC of the composite signal, reproduced, faithfully and parasitic pulses HC'. The start of these parasitic pulses HC' coincides with the start of the vertical synchronization pulses VC of the composite signal. The end of these parasitic pulses HC' coincides with the activation of the vertical synchronization signal VEXT (Q=VTH). In practice, these parasitic pulses are not troublesome for they are produced just before the refreshing of the screen by the activation of the vertical synchronization signal VEXT.

In the case of a composite signal CSYNCI having negative polarity, the extraction of the signals VEXT and HSYNCO is similar. There is then a decrementation of Q between QMAX and a value QH during the horizontal synchronization pulses, and the threshold VTH is fixed in such a way that it is below QH.

Figure 5:
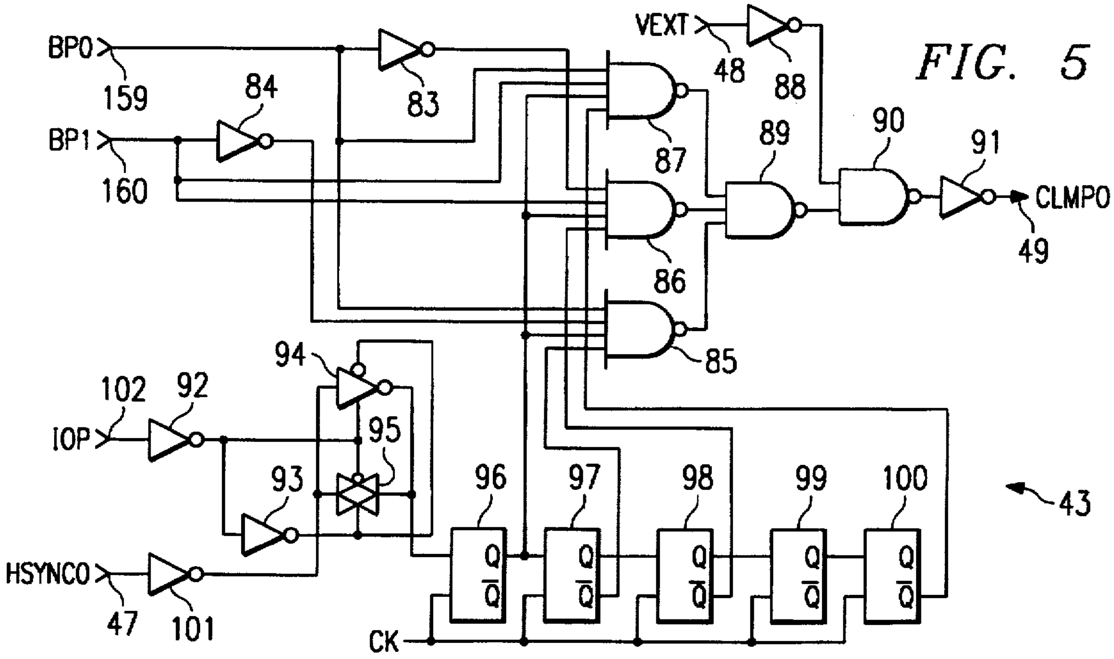
FIG. 5 shows a circuit to generate a black level acquisition signal.

With regard to the production of the black level signal CLMPO, it is done by means of the latch circuit 43 (FIG. 5).

The black level pulse signal CLMPO is activated in the time interval between, firstly, the end of the horizontal synchronization pulses of the signal HSYNCO and, secondly, the start of the video signal to be displayed on the corresponding line (see FIG. 10). A video signal has been shown containing both signals representing information elements to be displayed on lines and horizontal synchronization pulses associated with these lines. This is a signal received by filtering circuits. These circuits give only the synchronization signals to the circuit 1.

In the embodiment chosen, the signal CLMPO is put into a state, called an active state, at the end of the horizontal synchronization pulses of HSYNCO and put in the other state (called an inactive state) after a certain period of time.

It has been chosen to give a signal CLMPO whose active level is 1 and whose inactive level is 0 (positive polarity). There is no reason not to design a latch circuit that will enable this choice to be reversed or even to offer the user the use of either of the possibilities.

In the exemplary embodiment dealt with, it is chosen to program the duration for which the signal CLMPO is active so that it is equal to 250, 500 or 1000 ns. This programming is taken into account by the latch circuit 43 through logic signals BP0 and BP1 received from the microcontroller at the inputs 159 and 160, in the following way:

BP0=0, BP1=0: signal CLMPO inactive

BP0=1, BP1=0: signal CLMPO active for 250 ns

BP0=0, BP1=1: signal CLMPO active for 500 ns

BP0=1, BP1=1: signal CLMPO active for 1000 ns.

An embodiment of this circuit is illustrated in FIG. 5.

The input 159 is connected to:

the input of an inverter 83 whose output is connected to an input of a four-input NAND gate 86, an input of a four-input NAND gate 85, an input of a four-input NAND gate 87.

The input 160 is connected to:

the input of an inverter 84 whose output is connected to another input of the NAND gate 85, another input of the NAND gate 87, another input of the NAND gate 86.

The outputs of the NAND gates 85, 86 and 87 are connected to three inputs of a three-input NAND gate 89. The output of this NAND gate 89 is connected to an input of a two-input NAND gate 90. The other input of this NAND gate 90 is connected to the input 48 by means of an inverter 88. The output of this NAND gate 90 is connected to the input of an inverter 91 whose output corresponds to the output 49 of the latch circuit 43.

The input 47 is connected to the input of an inverter 101. The output of this inverter 101 is connected to the input of a MOS switch 95 and to the input of an inverter transmission gate 94.

The circuit receives a selection logic signal HOP at an input 102, this signal HOP representing the polarity of HSYNCO. This input 102 is connected to the input of an inverter 92. The output of this inverter 92 is connected to the input of an inverter 93, to the control gate of the P type transistor of the switch 95 and to the control gate of the N type output transistor of the inverter transmission gate 94.

The output of the inverter 93 is connected to the control gate of the N type transistor of the switch 95 and to the control gate of the P type output transistor of the inverter transmission gate 94.

The output of the inverter transmission gate 94 is connected to the input of a latch flip-flop circuit 96 whose rate is set by the clock signal CK.

If HOP=1, the input of the flip-flop 96 receives/HSYNCO (HSYNCO with positive polarity).

If HOP=0, the input of the flip-flop 96 receives HSYNCO (HSYNCO with negative polarity).

The non-inverter output of the flip-flop 96 is connected to another input of the NAND gate 87, to another input of the NAND gate 85 and to another input of the NAND gate 86 and to the input of a latch flip-flop circuit 97 whose rate is set by the clock signal CK. The non-inverter output of this flip-flop circuit 97 is connected to the input of a latch flip-flop circuit 98 whose rate is set by the clock signal CK. The inverter output of the flip-flop circuit 97 is connected to the last input of the NAND gate 85.

The non-inverter output of the flip-flop circuit 98 is connected to the input of a latch flip-flop circuit 99 whose rate is set by the clock signal CK. The inverter output of the flip-flop circuit 98 is connected to the last input of the NAND gate 86.

The non-inverter output of the flip-flop circuit 99 is connected to the input of a latch flip-flop circuit 100 whose rate is set by the clock signal CK. The inverter output of this flip-flop circuit 100 is connected to the last input of the NAND gate 87.

It will be noted that, given the flip-flop circuit system used, it is only the horizontal synchronization pulses of negative polarity that are considered, the flip-flop circuits being conventionally activated on a leading edge. This is why the polarity of the input signal HSYNCO is reversed if it is positive.

Figure 4:
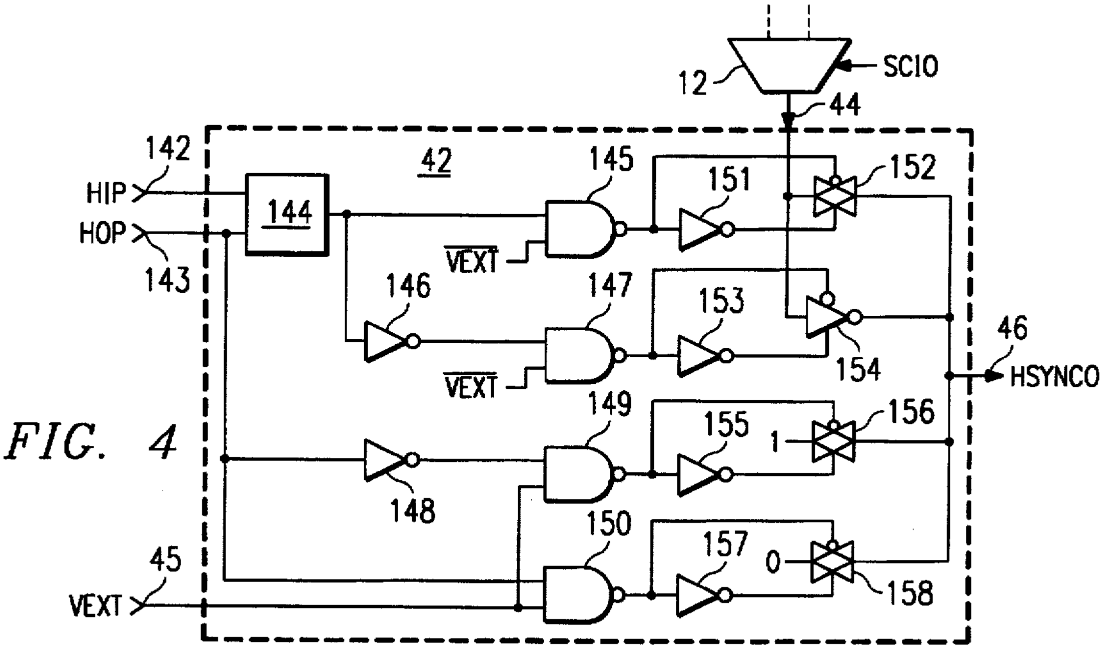
FIG. 4 shows a signal output circuit designed to give a horizontal synchronization signal so that this horizontal signal is inactive when, in the case of a composite input signal, the extracted vertical synchronization signal is active.

FIG. 4 illustrates a possible embodiment of the output circuit 42. As compared with FIG. 1, it has two additional inputs 142 and 143 to receive a logic signal HIP and the logic signal HOP, so as to enable a choice of the polarity of the synchronization output signal HSYNCO. It may be recalled furthermore that the output circuit 42 is arranged in such a way that the output horizontal synchronization pulses are inactivated when the vertical synchronization signal VEXT is active.

HIP and HOP are such that if they are in the same state, the polarity of the horizontal synchronization output signal is identical to that of the input signal, otherwise the polarity is reversed.

The output circuit 42 has a comparison circuit 144 similar to the comparison circuit 51. The two inputs of this comparison circuit 144 are connected to the inputs 142 and 143.

The output of this circuit 144 is connected to:

an input of a two-input NAND gate 145, whose other input is connected to the input 45 by means of an inverter (not shown) and therefore receives/VEXT, an input of an inverter 146 whose output is connected to the input of a two-input NAND gate 147. The other input of this NAND gate 147 receives/VEXT.

The output of the NAND gate 145 is connected firstly to the input of an inverter 151 and secondly to the control gate of a P type transistor of a MOS switch 152. The output of the inverter 151 is connected to the control gate of the N type transistor of the switch 152. The output of the NAND gate 147 is connected firstly to the input of an inverter 153 and secondly to the control gate of a P type output transistor of an inverter transmission gate 154. The output of the inverter 153 is connected to the control gate of the N type output transistor of the inverter transmission gate 154.

The inputs of the switch 152 and of the inverter transmission gate 154 are connected to the terminal 44. The outputs of the switch 152 and of the inverter transmission gate 154 are connected to the terminal 46.

The output circuit 42 also has an inverter 148 whose input is connected to the terminal 143. The output of this inverter 148 is connected to an input of a two-input NAND gate 149 whose other input is connected to the input 45. This input 45 is furthermore connected to an input of a two-input NAND gate 150 whose other input is connected to the terminal 143.

The output of the NAND gate 149 is connected firstly to an inverter 155 and secondly to the control gate of a P type transistor of a MOS switch 156. The output of the inverter 155 is connected to the control gate of the N type transistor of the switch 156. The input of this switch 156 is kept at the logic level 1 (typically by connection to a logic supply terminal of the circuit 1).

The output of the NAND gate 150 is connected firstly to the input of an inverter 157 and secondly to the control gate of a P type transistor of a MOS switch 158. The output of the inverter 157 is connected to the control gate of the N type transistor of the switch 158. The input of this switch 158 is kept at the logic level 0 (typically by connection to a ground terminal of the circuit 1).

The outputs of the switches 156 and 158 are also connected to the terminal 46.

It is possible, in one variant, to make an output circuit 42 that integrates the functions of the input multiplexer 12 in order to minimize the transfer time between the input terminals and the output terminals. It is enough to use three-input NAND gates 145 and 147 at the output of the comparison circuit 144. For example, the third inputs of the gates 145 and 147 would be connected to the output of an inverter receiving SCI0 at input and the inputs of the output elements (switch, transmission gate) would be connected to the input terminal 3. Furthermore, these gates 145 and 147 would be duplicated by means of associated NAND gates receiving SCI0, the output elements of which would be connected to the input terminal 4.

Figure 11:
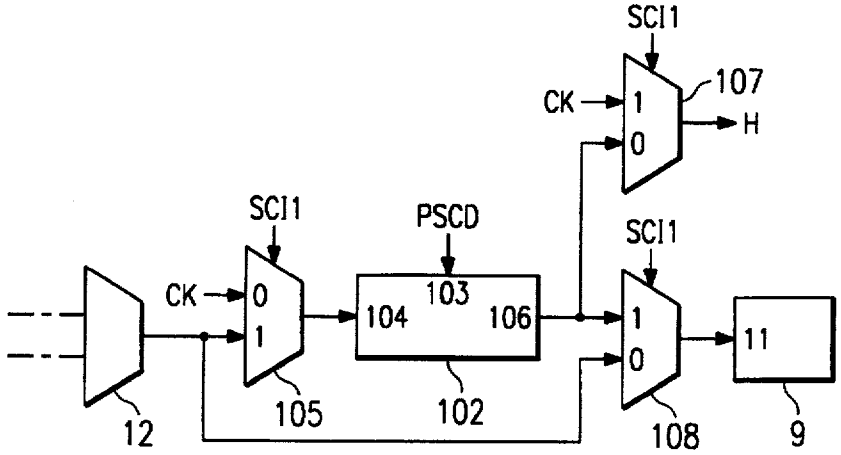
FIG. 11 shows an assembly of a clock frequency divider or a synchronization signal divider.

In a preferred embodiment illustrated in FIG. 11, the circuit 1 has a frequency divider 102 that enables the following:

firstly, the production of a counting clock signal H for the counter 25 that is compatible with the processing of vertical synchronization signals at this counter 25, secondly, the furnishing, to the counter 9, on its input 11, of a synchronization signal with a frequency that is lower than that of the synchronization signal given at output of the multiplexer 12.

The frequency divider 102 includes an input 104. This input 104 is connected to the output of a two-input multiplexer 105. This multiplexer 105 receives the clock signal CK at one input and its other input is connected to the output of the multiplexer 12. This multiplexer is controlled by the selection signal SCI1 to give the clock signal CK to the input 104 of the divider 102 if SCI1=0 (INCI-VSYNCI) and HSYNCI or CSYNCI if SCI1=1.

The divider 102 also has an input 103 for the reception, from the microcontroller 8, of a division enable command PSCD that inhibits or activates the divider 102.

This divider 102 finally has an output 106 to give either the desired clock signal or the desired synchronization signal depending on the state of the selection signal SCI1. This output 106 is connected to an input of a two-input multiplexer 107. The other input of this multiplexer 107 receives the clock signal CK. This multiplexer 107 is controlled by the selection signal SCI1. At output, it gives the counting clock signal H, H having the frequency of CK if SCI1=1 and a lower frequency if SCI1=0.

The output 106 of the divider 102 is furthermore connected to an input of a two-input multiplexer 108. The other input of this multiplexer 108 is connected to the output of the multiplexer 12. The multiplexer 108 is controlled by the selection signal SCI1. It connects the input 11 of the counter 9, either to the output 106 of the divider 102 if SCI1=1 or to the output of the multiplexer 12 if SCI1=0.

It is possible of course to choose to decouple the multiplexers 105 and 107 on the one hand and the multiplexer 108 on the other hand. For this purpose, it is enough to control this multiplexer 108 by means of a selection signal different from SCI1.

It is also possible to envisage a case where the circuit 1 has a circuit for the inversion of the output polarity VSYNCO 117, as is the case for the output circuit 42. It also makes it possible to give a synchronization signal to the input 10 of the second counter 9 which always has a positive polarity if indeed it is desired to fix the polarity of the signal received at the input 10. It also makes it possible to give the synchronization signal VEXT at this input 10 when there is a composite synchronization input signal CSYNCI. This enables the computation of the frequency of recurrence of the pulses of the signal VEXT.

Figure 12:
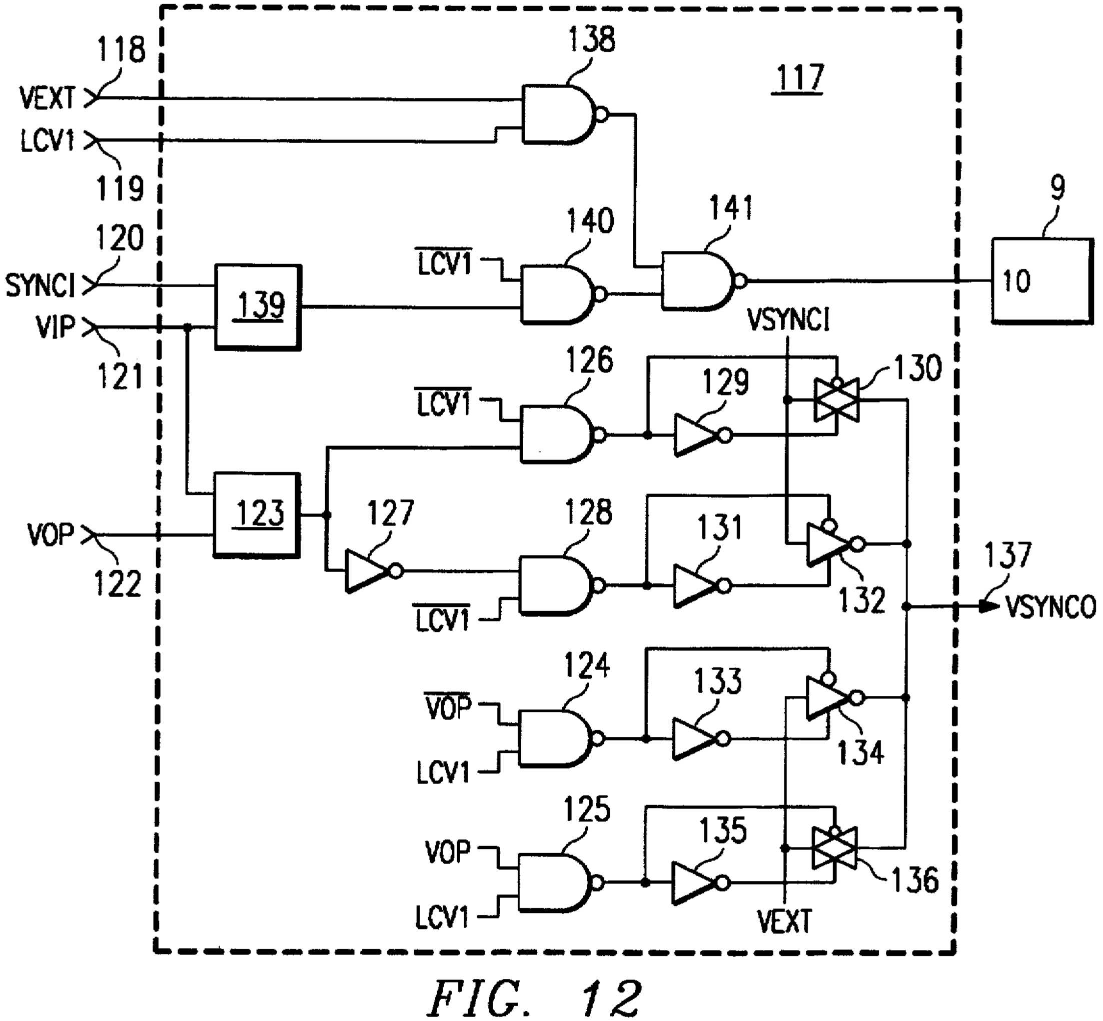
FIG. 12 shows a polarity inverter circuit of a horizontal synchronization output signal.

An inversion circuit 117 such as this is shown in FIG. 12. This polarity inversion circuit 117 may be positioned in place of the multiplexer 41 of FIG. 1, and between the input terminal 2 and the input 10 of the counter 9.

The polarity inversion circuit 117 includes:

an input 118 to receive the vertical synchronization signal VEXT, an input 119 to receive the acquisition/extraction signal LVC1, an input 120 to receive the vertical synchronization signal VSYNCI, an input 121 to receive a logic signal VIP coming from the microcontroller 8, an input 122 to receive a logic signal VOP coming from the microcontroller 8, an output 137 to give the vertical synchronization signal VSYNCO.

The logic signals VIP and VOP are such that:

if VOP=VIP then VSYNCO=VSYNCI if LVC1=0 and VSYNCO=VEXT if LCV1=1, else VSYNCO=/VSYNCI if LCV1=0 and VSYNCO=/VEXT if LCV1=0, if LCV1=1, the counter 9 receives VEXT (which always has positive polarity), if LCV1=0 and VIP=1, the counter 9 receives VSYNCI, if LCV1=0 and VIP=0, the counter 9 receives/VSYNCI.

The inversion circuit 117 comprises:

a comparison circuit 123, similar to the circuit 51, whose inputs are connected to the inputs 121 and 122 (VIP, VOP), a two-input NAND gate 124 which receives, at its inputs, /VOP (inverter connected to the input 122 not shown) and a two-input NAND gate 125 that receives VOP and LCV1 at its inputs.

The output of the comparison circuit 123 is connected firstly to an input of a two-input NAND gate 126 and, secondly, to the input of an inverter 127. The NAND gate 126 is connected by means of an inverter not shown to the input 119 (LCD1). The output of the inverter 127 is connected to an input of a two-input NAND gate 128. This NAND gate 128 receives/LCV1 at its other input.

The output of the NAND gate 126 is connected, firstly, to the input of an inverter 129 and, secondly, to the control gate of a P type transistor of a MOS switch 130. The output of the inverter 129 is connected to the control gate of the N type transistor of the switch 130.

The output of the NAND gate 128 is connected, firstly, to the input of an inverter 131 and, secondly, to the control gate of the P type output transistor of an inverter transmission gate 132. The output of the inverter 131 is connected to the control gate of the N type output transistor of the inverter transmission gate 132.

The output of the NAND gate 124 is connected, firstly, to the input of an inverter 133 and, secondly, to the control gate of the P type output transistor of an inverter transmission gate 134. The output of the inverter 133 is connected to the control gate of the N type output transistor of the inverter transmission gate 134.

The output of the NAND gate 125 is connected, firstly, to an input of an inverter 135 and, secondly, to the control gate of a P type transistor of a MOS switch 136. The output of the inverter 135 is connected to the control gate of the N type transistor of the switch 136.

The outputs of the switches 130 and 136 are connected to the output 137, as are the outputs of the inverter transmission gates 132 and 134.

The inversion circuit 117 also has another comparison circuit 139 whose inputs are connected to the inputs 120 and 121 (VSYNCI and VIP). The output of this comparison circuit is connected to an input of a two-input NAND gate 140 which receives/LCV1 at its other input. It also has a two-input NAND gate 138, its inputs being connected to the inputs 118 and 119 (VEXT and LCV1).

The outputs of the NAND gates 138 and 140 are connected to the two inputs of a two-input NAND gate 141, the output of which is connected to the input 10 of the counter 9.

No description shall be given here of the interfaces between the described circuit 1 and the circuits needed besides for the operation of the display equipment, and especially the links between the microcontroller and these circuits. Similarly, no particular information is presented with regard to the programming of the microcontroller, it being understood that the description is sufficiently precise with respect to the sequence of the tasks to be performed and the definition of the control signals to be generated in order to perform them efficiently. It can be seen clearly that the recognition of a standard is limited only by the capacity of the microcontroller to know the existence thereof, namely by the fact that the characteristics of this standard are memorized or not memorized in the memory associated with this microcontroller.

Provision could also be made for multiplexing means at input to receive synchronization signals arriving from different transmission lines if the screen is provided with different connectors. This would make it possible, for example, to connect two computers to one and the same screen, one of them being, for example, a workstation and the other a microcomputer, the user using these means for distinct tasks. In the prior art, it is not possible to make simultaneous displays of information coming from two computers. Nevertheless, nothing will prevent this in the future insofar as the screen would be provided with different connectors.

The above inventions are preferably incorporated in a specialized microcontroller for synchronization functions, known as the ST7271. This microcontroller provides a highly integrated solution for Synchronization Pulse processing for TV and Monitor applications. In particular, it offers the following features: Integration of Automatic polarity Detection using up/down counter for Horizontal and Vertical Sync; Integration of a Programmable pulse width clamping signal generator synchronized with the rising or falling edge of the Horizontal Sync Signal for the video black level; Integration of Output of Horizontal and Vertical sync signals from the ST7271 to external peripheral devices, with programmable polarity, after extraction from the composite sync input or from the separated sync inputs; and Integration of a flexible sync signal multiplexor able to accept inputs from sources including DSUB, BNC, and Sync on Green, with HSYCN1 or HSYNCI2 inputs, VSYNCI1 or VSYNCI2 inputs or CSYNCI Composite Sync input. This microcontroller and its data sheet are both available from SGS-Thomson, and are both hereby expressly incorporated by reference.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A method for the recognition of video standards, comprising the steps of:

memorizing a first value representing a duration;

producing a counting value, said counting value being incremented when a binary synchronization signal is in a first state and decremented when said binary synchronization signal is in a second state;

comparing said first value representing said duration and said counting value, at a given time of said binary synchronization signal; and producing a signal representing at least one characteristic of the standard being determined;

wherein said first value representing said duration is programmable.

2. The method of claim 1, wherein said step of comparing is done for a given time after the transition of a given type has taken place in said synchronization signal.

3. The method of claim 1, wherein said signal representing at least one characteristic of the standard being determined is produced after a certain number of transitions of a given type.

4. The method of claim 1, wherein said counting value is kept between two fixed values.

5. The method of claim 4, wherein said first value representing said duration is programmed to be equal to one of said two fixed values.

6. The method of claim 4, wherein said counting value is maintained at a second value chosen from among said two fixed values and a programmed value between said two fixed values.

7. The method of claim 6, wherein said programmed value represents a second duration greater than said duration for which said synchronization signal is in a given state.

8. The method of claim 6 wherein, when said counting value reaches said programmed value, the state of an extracted binary signal is changed to go into an active state, said extracted binary signal changing its state to go into an inactive state when said counting value reaches said second value.

9. The method of claim 8, wherein an output synchronization signal is produced from said synchronization signal and wherein said output synchronization signal is deactivated when said counting value reaches said programmed value.

10. The method of claim 9 wherein, from said output synchronization signal, there is produced a binary reference signal in such a way that said binary reference signal is activated when said output synchronization signal is deactivated.

11. The method of claim 10, wherein said reference signal is deactivated when said extracted binary signal is active.

12. A circuit for the recognition of video standards, said circuit comprising:

a microcontroller;

at least one input terminal to receive a synchronization input signal, and one output terminal to give a synchronization output signal;

a detection circuit receiving, at one input, said synchronization input signal and comprising means for the production, firstly, of an internal synchronization signal delayed with respect to said synchronization input signal and, secondly, a pick-up control logic signal;

a counter having its rate set by a counting clock signal and producing a counting value that is incremented or decremented depending on the state of said internal synchronization signal, said counting value being accessible by a parallel output port of said counter; and a register comprising a parallel input/output port to load said counting value when said pick-up control signal is in an active state.

13. The circuit of claim 12, further comprising a control circuit receiving said counting value at one input; and comparison means to compare said counting value with a minimum and maximum threshold.

14. The circuit of claim 13, wherein said control circuit produces a count enable logic signal that holds the incrementation or the decrementation of said counting value if said maximum or minimum threshold is reached by said counting value.

15. The circuit of claim 12, wherein said detection circuit places said pick-up control signal in its active state when it detects an edge of a given type in said synchronization input signal, said given type of said edge being defined by the state of a sensitivity logic signal coming from said microcontroller.

16. The circuit of claim 12, further comprising means to write a value in said register from said microcontroller.

17. The circuit of claim 12, further comprising a second counter receiving said synchronization input signal at a first input.

18. The circuit of claim 17, wherein said second counter is capable of giving said microcontroller a counting value by means of a data bus and an interruption signal.

19. The circuit of claim 13, wherein said control circuit comprises means to produce and give, at an output terminal thereof, a vertical synchronization signal extracted from an internal composite synchronization signal.

20. The circuit of claim 19, wherein said control circuit produces said extracted vertical synchronization signal when an acquisition/extraction logic signal coming from said microcontroller is in an active state.

21. The circuit of claim 13, further comprising comparison means to compare said counting value of said first counter with a programmable threshold value coming from said microcontroller.

22. The circuit of claim 21, wherein said programmable threshold value is written by said microcontroller in said register and wherein said control circuit includes an input to receive the contents of said register.

23. The circuit of claim 20, wherein said detection circuit deactivates said pick-up control signal when said acquisition/extraction signal is active.

24. The circuit of claim 19, further comprising, firstly, a second output terminal and, secondly, an output circuit that receives said extracted, vertical synchronization signal and comprises means to produce a second output synchronization signal from said input synchronization signal and to give said second output synchronization signal at said second output terminal, said second output synchronization signal being inactive when said extracted vertical synchronization signal is active.

25. The circuit of claim 24, further comprising a latch circuit that includes means to give a black level pulse signal at a third output terminal, said black level pulse signal being placed in an active state when said second output synchronization signal goes to the inactive state.

26. The circuit of claim 25, wherein the duration of said black level pulse signal is programmable and wherein said latch circuit receives selection logic signals from said microcontroller and comprises means to produce pulses whose duration is a function of the state of said selection logic signals received.

27. The circuit of claim 26, wherein said latch circuit comprises an input to receive said extracted synchronization signal and means to deactivate said black level signal when said extracted vertical synchronization signal is active.

28. The circuit of claim 12, further comprising means for the production, from a clock signal with a given frequency coming from said microcontroller, of said counting clock signal so that said counting clock signal has a frequency below that of said clock signal coming from said microcontroller.

29. The circuit of claim 17, further comprising means to give a synchronization signal to the input of said second counter with a lower frequency than that of said synchronization input signal.

30. The circuit of claim 12, further comprising a second input terminal to receive a second synchronization input signal and selection means to selectively give either said first or second synchronization input signal to said detection circuit as a function of the state of a logic selection signal coming from said microcontroller.

31. The circuit of claim 30, wherein the frequency of said counting clock signal given to said first counter is equal to the frequency of a clock signal coming from said microcontroller when said second synchronization input signal is selected, and lower that the frequency of said clock signal when said first synchronization input signal is selected.

32. The circuit of claim 30, wherein said second counter includes a second input to receive said second synchronization input signal.

33. The circuit of claim 32, further comprising means to give said second input of said second counter a signal with a frequency lower than the frequency of said second synchronization input signal.

34. The circuit of claim 30, further comprising a third input terminal to receive a third synchronization input signal and means to selectively give said second or third synchronization input signal to said output circuit and to the input of said detection circuit, depending on the state of a selection logic signal coming from said microcontroller.

35. The circuit of claim 12, further comprising means to reverse the polarity of said first, second, and third synchronization output signals with respect to the polarity of said first, second, and third synchronization input signals, respectively.

* * * * *